(12) United States Patent
Hirukawa

(10) Patent No.: US 10,998,541 B2
(45) Date of Patent: May 4, 2021

(54) METHOD AND APPARATUS FOR MANUFACTURING AN ELECTRODE SHEET

(71) Applicant: TOYOTA JIDOSHA KABUSHIKI KAISHA, Toyota (JP)

(72) Inventor: Tomofumi Hirukawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/247,751

(22) Filed: Jan. 15, 2019

(65) Prior Publication Data

US 2019/0296322 A1    Sep. 26, 2019

(30) Foreign Application Priority Data

Mar. 20, 2018  (JP) .............................. JP2018-052801

(51) Int. Cl.
  *H01M 4/04*   (2006.01)
  *H01M 4/139*  (2010.01)

(52) U.S. Cl.
  CPC ......... *H01M 4/0435* (2013.01); *H01M 4/139* (2013.01)

(58) Field of Classification Search
  CPC ........................... H01M 4/0435; H01M 4/139
  See application file for complete search history.

(56) References Cited

U.S. PATENT DOCUMENTS

| 2014/0004418 A1* | 1/2014 | Kobayashi | .......... | H01M 4/0404 |
| | | | | 429/211 |
| 2017/0141433 A1* | 5/2017 | Yoshima | ............... | H01M 4/485 |

FOREIGN PATENT DOCUMENTS

| JP | 11-003701 A | | 1/1999 | |
| JP | 2005317468 A | * | 11/2005 | |
| JP | 2009-245788 A | | 10/2009 | |
| KR | 101885850 B1 | * | 9/2018 | |
| WO | WO-2014156464 A1 | * | 10/2014 | .......... H01M 4/0435 |

OTHER PUBLICATIONS

KIPO English translation of KR-101885850-B1 (Year: 2018).*
EPO machine generated English translation of JP-2005317468-A (Year: 2005).*
EPO machine generated English translation of WO-2014156464-A1 (Year: 2014).*

* cited by examiner

*Primary Examiner* — Christopher P Domone
*Assistant Examiner* — Kimberly Wyluda
(74) *Attorney, Agent, or Firm* — Sughrue Mion, PLLC

(57) ABSTRACT

A method for manufacturing an electrode sheet including an electrode layer on both surfaces of a current collecting foil includes: feeding out an original electrode sheet including an unfinished electrode layer on each surface of the foil from a feeding part; causing a press roll pair to contact with the original sheet fed out to form the unfinished layers into electrode layers; receiving the sheet having passed through the roll pair by a sheet receiving part; and rotating rolls of the roll pair in a feeding direction. The feeding part, roll pair, and receiving part are placed such that the original sheet and the electrode sheet are to be wound on one of the rolls. The rolls are rotated such that a moving speed of cylindrical surface of one roll placed in a position where the sheets are wound thereon is higher than that of the other roll.

8 Claims, 5 Drawing Sheets

METHOD AND APPARATUS FOR
MANUFACTURING AN ELECTRODE SHEET

CROSS-REFERENCE TO RELATED APPLICATIONS

This application is based upon and claims the benefit of priority from the prior Japanese Patent Application No. 2018-052801 filed on Mar. 20, 2018, the entire contents of which are incorporated herein by reference.

BACKGROUND

Technical Field

This disclosure relates to a method and an apparatus for manufacturing an electrode sheet which is a component of a battery. More specifically, this disclosure relates to a method and an apparatus for manufacturing an electrode sheet including a current collecting foil and an electrode layer provided on both surfaces of the current collecting foil.

Related Art

Heretofore, a secondary battery and other various types of batteries have been made up by use of positive and negative electrode sheets. Many of those electrode sheets are each configured to include an electrode layer on both surfaces of a current collecting foil. Each electrode layer is made of electrode active material as a major component and formed in layers. In general, such an electrode sheet is produced in a way that a layer of a mixture of raw powder and a liquid component is formed on each surface of the current collecting foil, and then the liquid component is removed by volatilization. After volatilization of the liquid component, furthermore, the electrode layers are pressed in a thickness direction of the electrode layers (see for example Japanese unexamined patent application publication No. 2009-245788). This is because an electrode layer with higher density is more advantageous to get larger battery capacity.

SUMMARY

Technical Problems

However, the foregoing conventional art have the following problems. Specifically, if the density of an electrode layer having been pressed is to be sufficiently increased, a manufacturing facility is inevitably large in order to adapt the rolls used to press the electrode layer for high load. In JP2009-245788A, the rolls are additionally provided with a heating function to enhance the density of the electrode layer. However, such an added heating function also leads to complication and enlargement in size of the manufacturing facility.

This disclosure has been made to address the above problems in the conventional art and has a purpose to provide a method and an apparatus for manufacturing an electrode sheet with an electrode layer having high density while suppressing enlargement and complication of a facility.

Means of Solving the Problems

To achieve the above-mentioned purpose, one aspect of the present disclosure provides a method for manufacturing an electrode sheet, the electrode sheet including an electrode layer on both surfaces of a current collecting foil, the method comprising the steps of: feeding out an original electrode sheet from an original sheet feeding part, the original electrode sheet including an unfinished electrode layer on each of the surfaces of the current collecting foil; causing a press roll pair including a pair of rolls to contact with the original electrode sheet from both sides, the original electrode sheet being fed out from the original sheet feeding part, to form the unfinished electrode layers into electrode layers; receiving the electrode sheet having passed through the press roll pair by an electrode sheet receiving part; and causing a driving part to rotate each of the rolls of the press roll pair in a feeding direction of the original electrode sheet and the electrode sheet, wherein the original sheet feeding part, the press roll pair, and the electrode sheet receiving part are placed in a positional relationship such that the original electrode sheet and the electrode sheet are to be wound on one of the rolls of the press roll pair, and the rolls of the press roll pair are driven by the driving part to rotate such that a moving speed of cylindrical surface of an inner roll corresponding to one of the rolls, the inner roll being placed in a position where the original electrode sheet and the electrode sheet are wound on the inner roll, is higher than a moving speed of cylindrical surface of an outer roll corresponding to the other roll.

In the electrode sheet manufacturing method configured as above, the unfinished electrode layers corresponding to both surfaces of the original electrode sheet fed out from the original sheet delivery part are compressed when passing through the press roll pair, thereby forming into the electrode layers. Thus, the original electrode sheet is formed into the electrode sheet. Herein, the inner roll and the outer roll are configured such that the original electrode sheet or the electrode sheet is wound around the inner roll of the press roll pair and the outer roll rotates at a higher moving speed than the inner roll on which the original electrode sheet or the electrode sheet is wound. Therefore, during press work by the press roll pair, not only the press load but also the shear force caused by the difference in moving speed between the inner and outer rolls are applied to the unfinished electrode layers. Accordingly, the unfinished electrode layers are compressed more highly and thus a compression effect can be attained more than that obtained by only the press load. Consequently, an electrode sheet including a good electrode layer with high density can be produced.

In the foregoing electrode sheet manufacturing method, the moving speed of the cylindrical surface of the outer roll may be set within a range of 1.03 to 1.05 times higher than the moving speed of the cylindrical surface of the inner roll. The speed ratio in the above range can facilitate both the attainment of a high compression effect and the prevention of excessive load on the original electrode sheet and the electrode sheet easily.

In the foregoing electrode sheet manufacturing method, the original electrode sheet and the electrode sheet may be to be wound on the inner roll at a winding angle set in a range of 30° to 120°. The winding angle in the above range enables the inner roll to stably feed forward the original electrode sheet and the electrode sheet and also can prevent the original electrode sheet and the electrode sheet from being subjected to excessive stress caused by curving along the inner roll.

In the foregoing electrode sheet manufacturing method, an original electrode sheet in which the unfinished electrode layers corresponding to both surfaces are different in density from each other may be fed out from the original sheet feeding part such that the unfinished electrode layer with a higher density than the other unfinished electrode layer faces the inner roll in the press roll pair. Specifically, the original electrode sheet is fed in an orientation that the unfinished electrode layer having a lower density will contact with the outer roll when passing through the press roll pair. Since moving speed of cylindrical surface of the outer roll is higher than that of the inner roll, slippage is caused between the surface of the outer unfinished electrode layer and the surface of the outer roll. This produces a higher compression effect on the outer roll than on the inner roll. Thus, the density difference between the unfinished electrode layers corresponding to the both, front and back, surfaces of the original electrode sheet is reduced, so that the electrode sheet including a more homogeneous electrode layer on each surface can be produced.

According to another aspect, the present disclosure provides an apparatus for manufacturing an electrode sheet including an electrode layer on both surfaces of a current collecting foil, the apparatus comprising: an original sheet feeding part configured to feed out an original electrode sheet including an unfinished electrode layer on each of the surfaces of the current collecting foil; a press roll pair including a pair of rolls and configured to contact with the original electrode sheet from both sides, the original electrode sheet being fed out from the original sheet feeding part, to form the unfinished electrode layers into electrode layers; an electrode sheet receiving part configured to receive the electrode sheet having passed through the press roll pair; and a driving part configured to rotate each of the rolls of the press roll pair in a feeding direction of the original electrode sheet and the electrode sheet, wherein the original sheet feeding part, the press roll pair, and the electrode sheet receiving part are placed in a positional relationship such that the original electrode sheet and the electrode sheet are to be wound on one of the rolls of the press roll pair, and the rolls of the press roll pair are driven by the driving part to rotate such that a moving speed of cylindrical surface of an inner roll corresponding to one of the rolls, the inner roll being placed in a position where the original electrode sheet and the electrode sheet are wound on the inner roll, is higher than a moving speed of cylindrical surface of an outer roll corresponding to the other roll. The manufacturing apparatus configured as above can implement the electrode sheet manufacturing method in each of the foregoing configurations.

According to the above configuration, it is possible to provide a method and an apparatus for manufacturing an electrode sheet with an electrode layer having high density while suppressing enlargement and complication of a facility to be used for the method and the apparatus.

DETAILED DESCRIPTION OF THE EXEMPLARY EMBODIMENTS

Figure 1:
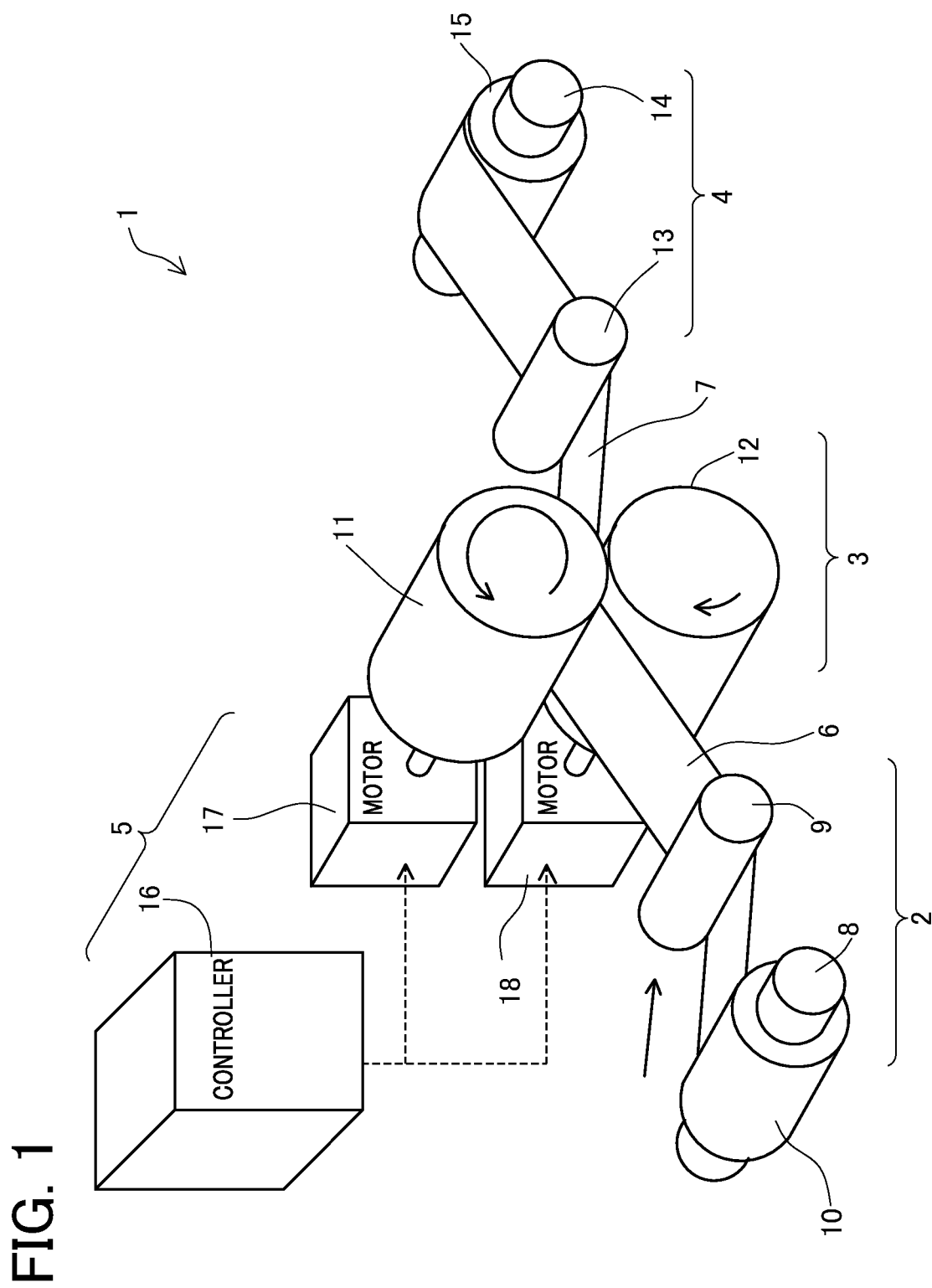
FIG. 1 is a perspective view of a manufacturing apparatus for an electrode sheet.

A detailed description of an embodiment of this disclosure will now be given referring to the accompanying drawings. The present embodiment is one typical embodiment of an apparatus for manufacturing an electrode sheet configured as shown in FIG. 1 and a method for manufacturing an electrode sheet using the apparatus.

An apparatus for manufacturing an electrode sheet (hereinafter, also simply referred to as a "manufacturing apparatus") 1 shown in FIG. 1 includes an original sheet feeding part 2, a press roll pair 3, an electrode sheet receiving part 4, and a driving part 5. The original sheet feeding part 2 is configured to feed an original electrode sheet 6 toward the press roll pair 3. The press roll pair 3 is configured to contact with the original electrode sheet 6 from both sides of the sheet 6 (e.g., from above and below the sheet 6 in the figure) in a thickness direction thereof to apply pressure on the original electrode sheet 6 to thereby form an electrode sheet 7. The electrode sheet receiving part 4 is configured to take up the electrode sheet 7 fed forward from the press roll pair 3. The driving part 5 is configured to apply rotation of each roll of the press roll pair 3. The details of the above-mentioned parts will be described below.

The original sheet feeding part 2 includes a roll mounting shaft 8 and a tension roller 9. The roll mounting shaft 8 is configured to attach thereon an original sheet coil 10. This original sheet coil 10 is a roll of the original electrode sheet 6 wound into a rolled form. The tension roller 9 is configured to apply tensile force on the original electrode sheet 6 between the original coil 10 and the press roll pair 3.

The press roll pair 3 consists of a pair of rolls, i.e., a first roll 11 and a second roll 12. The press roll pair 3 is configured to allow the original electrode sheet 6 to pass between the first roll 11 and the second roll 12. When passing through the press roll pair 3, the original electrode sheet 6 is slightly compressed from above and below in its thickness direction and thus formed into the electrode sheet 7. In FIG. 1, the first roll 11 is an upper roll located above the electrode sheets 6 and 7 and the second roll 12 is a lower roll located below the same.

The electrode sheet receiving part 4 includes a tension roller 13 and a take-up shaft 14. This take-up shaft 14 is configured to take up the electrode sheet 7 having passed through the press roll pair 3 to form an electrode sheet coil 15. The tension roller 13 is configured to apply tensile force on the electrode sheet 7 between the press roll pair 3 and the electrode sheet coil 15. Furthermore, the tension roller 9 and the tension roller 13 are arranged to define a winding angle (a contact angle) of the original electrode sheet 6 and the electrode sheet 7 to be wound on the second roll 12. This winding angle will be described later in detail.

The driving part 5 includes a controller 16, a first motor 17, and a second motor 18. The first motor 17 and the second motor 18 are configured to respectively rotate the first roll 11 and the second roll 12. The rotational directions of the first roll 11 and the second roll 12 are both directed to move forward the original electrode sheet 6 and the electrode sheet 7 in a feeding direction from the original sheet feeding part 2 to the electrode sheet receiving part 4. The controller 16 is configured to control the first motor 17 and the second motor 18 to separately rotate the first roll 11 and the second roll 12 at different circumferential speeds from each other. The relationship in rotational speed between the first roll 11 and the second roll 12 will be described later.

Figure 2:
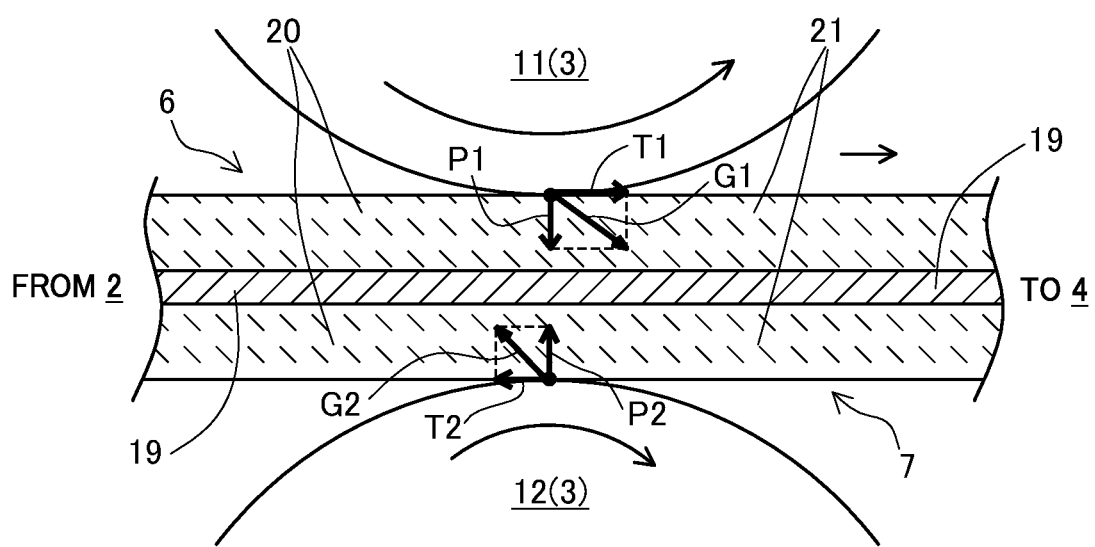
FIG. 2 is a cross-sectional view to show a state of an electrode sheet at or around a portion pressed by a press roll pair.

Herein, the original electrode sheet 6 and the electrode sheet 7 will be described in detail below. The original electrode sheet 6 and the electrode sheet 7 are actually identical to each other, but they are referred to by different names in the present embodiment. To be concrete, an electrode sheet in an unfinished state, that is, an unfinished electrode sheet yet to be pressed by the press roll pair 3, is named as the original electrode sheet 6. On the other hand, an electrode sheet in a finished state, that is, an electrode sheet having been pressed into a finished electrode sheet, is named as the electrode sheet 7. The structure of the original electrode sheet 6 and the electrode sheet 7 is described with reference to FIG. 2. FIG. 2 shows each state of the original electrode sheet 6 and electrode sheet 7 at or around their portions pressed by the press roll pair 3.

The original electrode sheet 6 consists of a current collecting foil 19 and unfinished electrode layers 20 formed one on each of both surfaces of the current collecting foil 19. The electrode sheet 7 consists of the current collecting foil 19 and electrode layers 21 formed one on each of both surfaces of the current collecting foil 19. Each electrode layer 21 is a layer primarily made of electrode active material. Each unfinished electrode layer 20 is an unfinished electrode layer that will be pressed by the press roll pair 3 and compressed in the thickness direction to form the electrode layer 21. In other words, the unfinished electrode layers 20 are lower in density than the finished electrode layers 21, but these layers 20 and 21 are not particularly different from each other excepting the density. The original electrode sheet 6 is in a state after the current collecting foil 19 is formed, on each surface thereof, with a layer made of raw powder and liquid component for forming the electrode layer 21 and then subjected to a drying treatment, but not yet to be pressed by the press roll pair 3. A roll of the original sheet at this stage wound into a rolled form is the original sheet coil 10.

Figure 3:
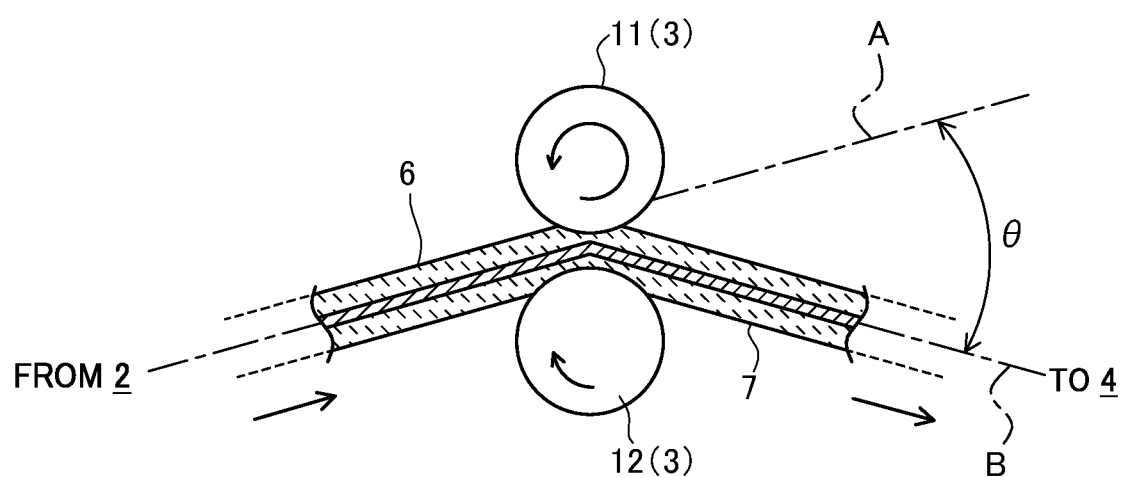
FIG. 3 is a front view to explain a winding angle of the electrode sheet on one roll of the press roll pair.

The following explanation is given to the winding angle of the original electrode sheet 6 and the electrode sheet 7 with respect to the second roll 12. FIG. 3 shows a positional relationship of the original electrode sheet 6 and the electrode sheet 7 to the second roll 12. As shown in FIG. 3, the original electrode sheet 6 and the electrode sheet 7 pass through the press roll pair 3 while curving or winding around one of the rolls of the press roll pair 3 without passing straight through the press roll pair 3. In the present embodiment, this one roll around which the original electrode sheet 6 and the electrode sheet 7 are wound is the second roll 12. In other words, the original electrode sheet 6 and the electrode sheet 7 contact with the second roll 12 over a zone of a certain length. In contrast, the original electrode sheet 6 and the electrode sheet 7 contact with the first roll 11 at a substantial single position. Thus, the feeding speed of the original electrode sheet 6 and the electrode sheet 7 is mainly controlled by the rotation of the second roll 12. The first roll 11 is one example of an outer roll located on the outer side of an electrode sheet in a winding state and the second roll 12 is one example of an inner roll located on the inner side of the same in the present disclosure.

In the present embodiment, the winding angle θ is set in a range of 30° to 120°, more preferably, in a range of 30° to 90°. Specifically, if the winding angle θ is too small (close to a straight path), the original electrode sheet 6 and the electrode sheet 7 are not stably fed by the rotation of the second roll 12. On the other hand, if the winding angle θ is too large (close to a U-turn path), the original electrode sheet 6 and the electrode sheet 7 are subjected to large stress by curving at such a large winding angle θ. Please note that, in FIG. 2, the original electrode sheet 6 and the electrode sheet 7 are illustrated as being in a straight form without regard to the winding angle θ for convenience. Furthermore, the manufacturing apparatus 1 may also be configured such that at least one of the tension roller 9 and the tension roller 13 can be moved to any position in order to serve the function of adjusting the winding angle θ. The winding angle θ is an angle formed between a direction (i.e., an imaginary line A in FIG. 3) extending on a downstream side of the press roll pair 3 from a traveling direction of the original electrode sheet 6 on an upstream side of the press roll pair 3 and a traveling direction of the electrode sheet 7 (i.e., a center line B of the sheet 7 in FIG. 3) extending on the downstream side of the press roll pair 3.

Successively, the relationship in rotational speed between the first roll 11 and the second roll 12 will be described below. The manufacturing apparatus 1 in the present embodiment is configured to make a difference in moving speed of cylindrical surface between the first roll 11 and the second roll 12 during rotation. In other words, when the first roll 11 and the second roll 12 have the same diameter, their rotational speeds are set different from each other. The following explanation is made assuming that the first roll 11 and the second roll 12 have the same diameter.

In the present embodiment, the rotational speed of the first roll 11 is set higher than the rotational speed of the second roll 12. Therefore the first roll 11 is excessively rotated relative to movement of the original electrode sheet 6 and the electrode sheet 7. This is because the feeding, or moving, speed of the original electrode sheet 6 and the electrode sheet 7 depends on the rotational speed of the second roll 12 that contacts with the original electrode sheet 6 and the electrode sheet 7 over a longer distance than the first roll 11. Herein, the forces applied by the first roll 11 and the second roll 12 to the unfinished electrode layers 20 of the original electrode sheet 6 are explained below. Arrows P1, P2, T1, T2, G1, and G2 in FIG. 2 indicate the forces applied to the unfinished electrode layers 20 at a position nipped by the first roll 11 and the second roll 12. Herein, one of the unfinished electrode layers 20, located on the upper side in FIG. 2, is referred to as an "upper unfinished electrode layer 20" corresponding to a front surface of the original electrode sheet 6, and the other one, located on the lower side in FIG. 2, is referred to as a "lower unfinished electrode 20" corresponding to a back surface of the same. Those forces are defined as below.

P1: Compressing force applied by the first roll 11 to the upper unfinished electrode layer 20
    P2: Compressing force applied by the second roll 12 to the lower unfinished electrode layer 20
    T1: Shearing force applied by the first roll 11 to the upper unfinished electrode layer 20
    T2: Shearing force applied by the second roll 12 to the lower unfinished electrode layer 20
    G1: Resultant force of Force P1 and Force T1
    G2: Resultant force of Force P2 and Force T2

The force P1 and the force P2 act in the thickness direction of each unfinished electrode layer 20. Specifically, these forces P1 and P2 are opposite in direction and equal in magnitude. The force T1 and the force T2 act in the feeding direction or the anti-feeding direction; that is, the force T1 is a forward acting force and the force T2 is a backward acting force. Concretely, the force T1 is directed in the forward direction because the upper unfinished electrode layer 20 is urged forward by the first roll 11 that is excessively rotating. The force T2 is directed in the backward direction because the second roll 12 rotating more slowly than the first roll 11 brakes the excessive forward movement of the original electrode sheet 6 caused by the first roll 11. In comparison of magnitude between the force T1 and the force T2, the force T1 is larger than the force T2. This results from the foregoing difference in rotational speed. However, the difference in magnitude between those forces T1 and T2 is absorbed by sliding between the first roll 11 and the upper unfinished electrode layer 20. This magnitude difference between the force T1 and the force T2 generates a magnitude difference between the resultant force G1 and the resultant force G2 that the resultant force G1 is larger in magnitude than the resultant force G2.

Figure 4:
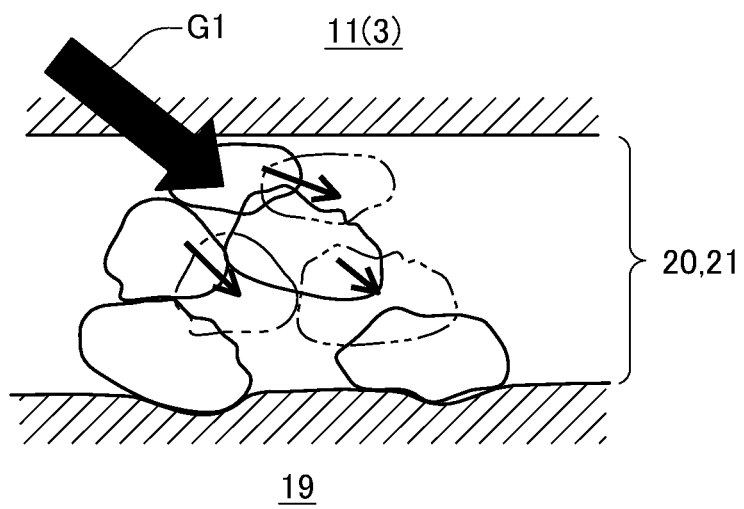
FIG. 4 is an enlarged cross-sectional view of an electrode layer to be compressed by pressing force in the present embodiment.
Figure 5:
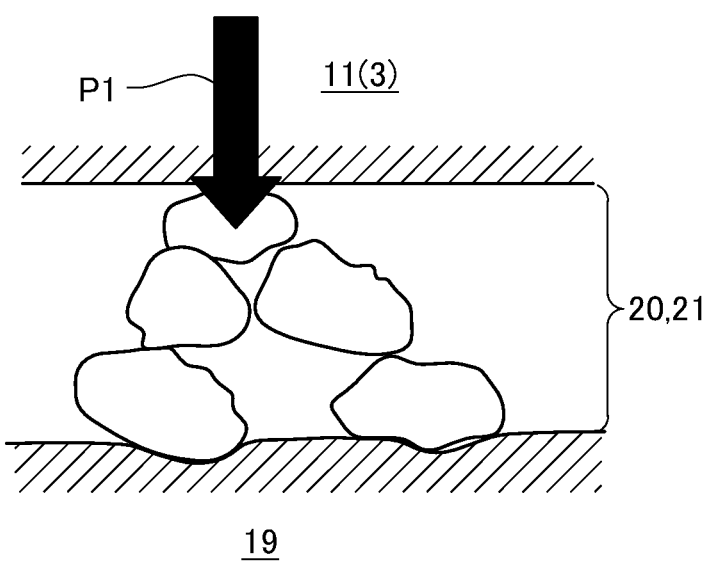
FIG. 5 is an enlarged cross-sectional view of an electrode layer to be compressed by pressing force in a comparative example.

In the press roll pair 3 in the present embodiment, the oblique forces defined as the foregoing resultant forces G1 and G2 are applied to the unfinished electrode layers 20 of the original electrode sheet 6. Accordingly, constituent particles of each unfinished electrode layer 20 are easily moved by press work as shown in FIG. 4. This can achieve a high compression effect even if a load applied by press work is not so large. In contrast, when only the compressing force P1 acts in the thickness direction, as shown in FIG. 5, the constituent particles are apt to stay with high stability against the pressing load. Therefore, unless the pressing load is set larger to increase the force P1 itself, the high compression effect could not be obtained. If there is no difference in rotational speed between the first roll 11 and the second roll 12, the constituent particles are likely to stay as shown in FIG. 5. In the present embodiment, the first roll 11 and the second roll 12 are controlled to rotate at different rotational speeds from each other to obtain the high compression effect as shown in FIG. 4. The current collecting foil 19 is a metallic foil having extremely higher hardness than the electrode layers 21, and thus the current collecting foil 19 is hardly compressed by the press roll pair 3.

In the present embodiment, furthermore, with respect to the unfinished electrode layers 20 corresponding to the front and back surfaces of the original electrode sheet 6, a larger compressing force is exerted on the unfinished electrode layer 20 placed on a side facing the first roll 11 than a compressing force exerted on the other unfinished electrode layer 20. This also results from the difference in rotational speed between the first roll 11 and the second roll 12. Further, by just that much, the compression effect attained by press work is slightly larger in the unfinished electrode layer 20 in contact with the first roll 11 than in the unfinished electrode layer 20 in contact with the second roll 12.

Accordingly, when a difference in density originally exists between the upper and lower unfinished electrode layers 20 of the original electrode sheet 6, this density difference can be reduced by passing through the press roll pair 3. Specifically, the original sheet coil 10 has only to be attached to the roll mounting shaft 8 such that the unfinished electrode layer 20 having a higher density will face to the second roll 12.

Actually, a density difference often exists between the front and back unfinished electrode layers 20 of the original electrode sheet 6. The reason is in the process of manufacturing the original electrode sheet 6. Specifically, in the manufacturing process of the original electrode sheet 6, in most cases, the front and back unfinished electrode layers 20 are formed in turn, i.e., one at a time, on either surface of the current collecting foil 19 such that both layers 20 are not formed at the same time. Further, the press work is performed for adjusting of coating weight or for flattening of each unfinished electrode layer 20 every time each layer is formed. As a result, the first formed unfinished electrode layer 20 is subjected to the press work two times. In contrast, the manufacturing apparatus 1 in the present embodiment can manufacture the electrode sheet 7 with a reduced density difference between the front and back sides. When the density difference between the front and back unfinished electrode layers 20 of the original electrode sheet 6 is small or when the allowable limit of the density difference between the front and back electrode layers 21 of the electrode sheet 7 corresponding to a finished product is large, the original sheet coil 10 may also be mounted in a reversed orientation without any problems.

Herein, the relationship between a difference in rotational speed between the first roll 11 and the second roll 12 and a density increasing rate from the unfinished electrode layers 20 to the electrode layers 21 will be described below with reference to FIG. 6. The present inventor(s) carried out a test for evaluating the above relationship under the following conditions:

Type of electrode sheet: Thick coating weight positive electrode sheet

Pressing load (Linear pressure): 9800 N/cm

Feeding speed: 10 m/min.

Roll diameter: 39 cm (in each of the first roll 11 and the second roll 12)

Winding angle θ: 30°

In this test, the rotational speed of the second roll 12 is set constant to a rotational speed for achieving the foregoing feeding speed, and the rotational speed of the first roll 11 is varied to generate a difference in rotational speed therefrom. Further, the density of the electrode layer 21 (i.e., the density after press work, or "post-press density") located facing the first roll 11 after press work is calculated based on the coating weight (i.e., an adhesion amount per area) and the thickness of the layer. The higher this calculated post-press density is, the more excellent the quality of the electrode layer 21 is. In contrast, the lower the calculated post-press density, the poorer the quality of the electrode layer 21.

Figure 6:
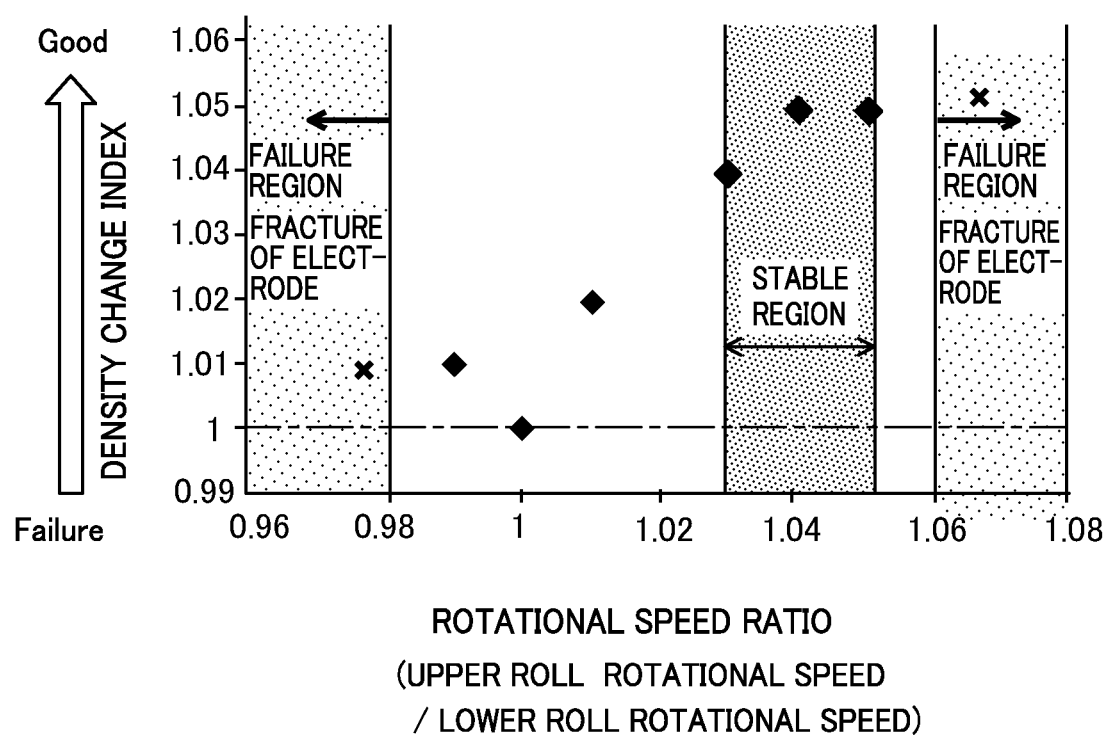
FIG. 6 is a graph showing test results of a relationship between a difference in rotational speed between rolls and a density increasing rate of an electrode layer.

Results of the test are shown in a graph in FIG. 6. The horizontal axis in the graph represents the rotational speed ratio between the first roll (i.e. upper roll) 11 and the second roll (i.e. lower roll) 12. Specifically, a rotational speed ratio of "1" in the horizontal axis indicates that both the rolls 11 and 12 are equal in rotational speed. In the graph, the ratio increasing rightward in the horizontal axis means that the rotational speed of the first roll 11 is higher; conversely, the ratio decreasing leftward means that the rotational speed of the first roll 11 is slower. The vertical axis in the graph indicates an index of change in density (hereinafter, a "density change index") of the electrode layer 21 located facing the first roll 11.

Herein, this density change index is defined as below:

Density change index=Post-press density of Electrode layer facing the first roll 11/Reference density where the "reference density" represents a post-press density of the electrode layer facing the first roll 11 at a rotational speed ratio of 1.

In FIG. 6, the density change index at each rotational speed ratio is plotted. A plotted point with a rhombic mark indicates that an electrode sheet has been appropriately pressed without causing breakage or fracture. A plotted point with an X mark indicates that an electrode sheet has been broken or fractured. Even in this failure case, the density change index could be calculated.

In FIG. 6, the density change index is 1 at a rotational speed ratio of 1 in the horizontal axis. This stands to reason from the foregoing definition of the terms. As the ratio increases rightward from 1 in the graph, that is, as the rotational speed of the first roll 11 is higher, the obtained density change index is larger than 1. However, when the rotational speed ratio exceeds 1.06, the electrode sheet is fractured, resulting in a failure. FIG. 6 reveals that a rotational speed ratio regarded as being especially excellent falls within a range of 1.03 to 1.05 indicated as "STABLE REGION" (representing the region where the original electrode sheet 6 and the electrode sheet 7 can be stably fed forward and the electrode layers 21 have got compressed sufficiently) in the figure. Specifically, the moving speed of the cylindrical surface of the first roll 11 is within a range of 1.03 to 1.05 times higher than the moving speed of the cylindrical surface of the second roll 12. This is because no fracture occurs in the electrode sheet while a density change index of as slightly high as 1.04 or more is obtained.

In contrast, on the left side of 1 in the horizontal axis in FIG. 6, different from the right side, any particularly good region is not found. Specifically, the density change index appears to slightly increase at a speed ratio of 0.99, but the electrode sheet is very likely to be fractured at this side. In other words, even when the rotational speed of the first roll 11 is set just slightly slower than the rotational speed of the second roll 12, down to a speed ratio of about 0.98, a facture has occurred. Thus, it is undesirable to reversely set the magnitude relationship in rotational speed between the rolls 11 and 12 from that in the present embodiment.

The electrode sheet is manufactured using the manufacturing apparatus 1 in the present embodiment in the following manner. Firstly, the original sheet coil 10 is mounted on the roll mounting shaft 8. At that time, as described above, the coil 10 may be attached in such an orientation as to consider the density difference between the unfinished electrode layers 20. The original electrode sheet 6 unreeled from the original sheet coil 10 is fed into the press roll pair 3 through the tension roller 9. Each roll of the press roll pair 3 is previously caused to rotate at the rotational speed in the foregoing relationship. The electrode sheet 7 fed from the press roll pair 3 is guided to the take-up shaft 14 through the tension roller 13, and then the electrode sheet 7 is wound up in the form of the electrode sheet coil 15. Accordingly, the good-quality electrode sheet 7 can be produced as described above.

According to the configuration in the present embodiment described above in detail, the original electrode sheet 6 and the electrode sheet 7 are placed to be wound on one roll (e.g., the second roll 12) of the press roll pair 3 and further the rotational speeds of the rolls 11 and 12 are set different from each other such that the first roll 11 located on the outer side of the sheets 6 and 7 in a winding state is rotated at a higher speed than the second roll 12. This can effectively compress the unfinished electrode layers 20 to form the electrode sheet 7 including the electrode layers 21 with good quality. The above-described configuration can achieve the manufacturing method and the manufacturing apparatus 1 for an electrode sheet with the high density electrode layers 21 obtained even without exactly adapting the press roll pair 3 for high load.

The foregoing embodiments are mere examples and give no limitation to the present invention. The present invention may be embodied in other specific forms without departing from the essential characteristics thereof. For instance, in the foregoing embodiment, the motors, i.e., the first motor 17 and the second motor 18, are respectively provided for the first roll 11 and the second roll 12 to drive these rolls 11 and 12 separately. As an alternative, a single motor may be used in common to drive both the first roll 11 and the second roll 12 to generate a difference in rotational speed therebetween by a gear ratio of drive transmission gears.

In the foregoing embodiment, furthermore, the first roll 11 and the second roll 12 are designed with the same diameter but with different rotational speeds to make a difference in moving speed of cylindrical surface that is circumferential speed between the rolls 11 and 12. As an alternative, the rotational speeds of the first roll 11 and the second roll 12 may be set equal and instead the diameters of the first roll 11 and the second roll 12 may be set different to obtain the difference in moving speed of cylindrical surface. As another alternative, the first roll 11 and the second roll 12 may also be designed with different radius and rotated at different rotational speeds to make a difference in moving speed of cylindrical surface.

Use of the original sheet coil 10 in the original sheet feeding part 2 is not necessarily required. As an alternative, it may be configured to directly receive and feed the original electrode sheet 6 from a device for manufacturing the original electrode sheet 6 to pass through the press roll pair 3. Similarly, winding of the electrode sheet 7 by the electrode sheet receiving part 4 is not necessarily required. As an alternative, it may be configured to directly feed the electrode sheet 7 to a device for subjecting the electrode sheet 7 to a next process. Moreover, the electrode sheet to be manufactured may be incorporated in any types of batteries, such as a lithium ion battery, a nickel hydride battery, and a solid-state battery. The electrode sheet to be manufactured may also be applied to both a positive electrode sheet and a negative electrode sheet.

REFERENCE SIGNS LIST

1 Manufacturing apparatus for electrode sheet
2 Original sheet feeding part
3 Press roll pair
4 Electrode sheet receiving part
5 Drive part
6 Original electrode sheet
7 Electrode sheet
8 Roll mounting shaft
9 Tension roller
11 First roll
12 Second roll
13 Tension roller
14 Take-up shaft
19 Current collecting foil
20 Unfinished electrode layer
21 Electrode layer
θ Winding angle

What is claimed is:

1. A method for manufacturing an electrode sheet, the electrode sheet including an electrode layer on both surfaces of a current collecting foil, the method comprising:
   feeding out an original electrode sheet from an original sheet feeding part, the original electrode sheet including an unfinished electrode layer on each of the surfaces of the current collecting foil;
   causing a press roll pair including an inner roll and an outer roll to contact with the original electrode sheet from both sides, the original electrode sheet being fed out from the original sheet feeding part, to form the unfinished electrode layers into electrode layers;

receiving the electrode sheet having passed through the press roll pair by an electrode sheet receiving part; and causing a driving part to rotate each of the rolls of the press roll pair in a feeding direction of the original electrode sheet and the electrode sheet, wherein the original sheet feeding part, the press roll pair, and the electrode sheet receiving part are placed in a positional relationship such that the original electrode sheet and the electrode sheet are to be wound on one of the rolls of the press roll pair, the rolls of the press roll pair are driven by the driving part to rotate such that a moving speed of a cylindrical surface of the outer roll is higher than a moving speed of a cylindrical surface of the inner roll, the inner roll being placed in a position where the original electrode sheet and the electrode sheet are wound on the inner roll, and the moving speed of the cylindrical surface of the outer roll is set within a range of 1.03 to 1.05 times higher than the moving speed of the cylindrical surface of the inner roll.

2. The method for manufacturing an electrode sheet according to claim 1, wherein the original electrode sheet and the electrode sheet are to be wound on the inner roll at a winding angle set in a range of 30° to 120°.

3. The method for manufacturing an electrode sheet according to claim 1, wherein the original electrode sheet, in which the unfinished electrode layers corresponding to both surfaces, are different in density from each other, is fed out from the original sheet feeding part such that the unfinished electrode layer with a higher density than the other unfinished electrode layer faces the inner roll in the press roll pair.

4. The method for manufacturing an electrode sheet according to claim 2, wherein the original electrode sheet, in which the unfinished electrode layers corresponding to both surfaces, are different in density from each other, is fed out from the original sheet feeding part such that the unfinished electrode layer with a higher density than the other unfinished electrode layer faces the inner roll in the press roll pair.

5. An apparatus for manufacturing an electrode sheet including an electrode layer on both surfaces of a current collecting foil, the apparatus comprising:

an original sheet feeding part configured to feed out an original electrode sheet including an unfinished electrode layer on each of the surfaces of the current collecting foil;

a press roll pair including an inner roll and an outer roll and configured to contact with the original electrode sheet from both sides, the original electrode sheet being fed out from the original sheet feeding part, to form the unfinished electrode layers into electrode layers;

an electrode sheet receiving part configured to receive the electrode sheet having passed through the press roll pair; and a driving part configured to rotate each of the rolls of the press roll pair in a feeding direction of the original electrode sheet and the electrode sheet, wherein the original sheet feeding part, the press roll pair, and the electrode sheet receiving part are placed in a positional relationship such that the original electrode sheet and the electrode sheet are to be wound on one of the rolls of the press roll pair, and the rolls of the press roll pair are driven by the driving part to rotate such that a moving speed of a cylindrical surface of the outer roll is higher than a moving speed of a cylindrical surface of the inner roll, the inner roll being placed in a position where the original electrode sheet and the electrode sheet are wound on the inner roll corresponding to the other roll, and the driving part is configured to set the moving speed of the cylindrical surface of the outer roll within a range of 1.03 to 1.05 times higher than the moving speed of the cylindrical surface of the inner roll.

6. The apparatus for manufacturing an electrode sheet according to claim 5, wherein the original sheet feeding part, the press roll pair, and the electrode sheet receiving part are placed in a positional relationship to set a winding angle of the original electrode sheet and the electrode sheet on the inner roll in a range of 30° to 120°.

7. The apparatus for manufacturing an electrode sheet according to claim 5, wherein the original sheet feeding part feeds out the original electrode sheet in which the unfinished electrode layers corresponding to both surfaces are different in density from each other such that the unfinished electrode layer with a higher density than the other unfinished electrode layer faces the inner roll in the press roll pair.

8. The apparatus for manufacturing an electrode sheet according to claim 6, wherein the original sheet feeding part feeds out the original electrode sheet in which the unfinished electrode layers corresponding to both surfaces are different in density from each other such that the unfinished electrode layer with a higher density than the other unfinished electrode layer faces the inner roll in the press roll pair.

* * * * *